United States Patent

Corbier

[19]

[11] Patent Number: 6,008,637
[45] Date of Patent: Dec. 28, 1999

[54] SENSING ROTATION ANGLE

[75] Inventor: Jean-Paul Corbier, Beausoleil, France

[73] Assignee: Eaton Corporation, Cleveland, Ohio

[21] Appl. No.: 09/016,697

[22] Filed: Jan. 30, 1998

[30] Foreign Application Priority Data

Feb. 7, 1997 [FR] France ................................ 9709151

[51] Int. Cl.⁶ .............................. G01P 3/52; G01R 33/02
[52] U.S. Cl. ...................... 324/165; 324/207.25; 702/183
[58] Field of Search .................................. 324/160, 163, 324/165, 166, 175, 178, 207.25, 244.1; 250/231.13, 227.21; 702/116–118, 142, 145, 150, 151, 182, 183

Primary Examiner—Jay Patidar
Attorney, Agent, or Firm—Roger A. Johnston

[57] ABSTRACT

Operational diagnostic system for an angle detector (C) which measures the angle of a rotating part (2) via at least two dual-state logic signals (A, B) processed by an electronic device which encodes them as the weighted sum of their voltages in order to produce an analog signal at a voltage which is always greater than a predefined threshold when angle detector (C) functions normally, in such a way that the value of the measured angle is transmitted over a single electrical connection (S) connecting the output of angle detector (C) to a processing device (U) of the processor type, and the connection (S) is also used by the processing device (U) to transmit the command signal to start testing of the operation of the detector (C), and to transmit the result information from the detector (C) to the processing device (U), and features the following:

- an electronic device which lowers the voltage of detector C's output signal below the predefined threshold in response to a diagnostic command signal from the processing device (U), and
- an electronic device which detects the lowering of the detector (C) output signal, connected to an electronic device which forces each of the dual-state logic signals to reach a value enabling the processing device (U) to determine and control the resulting output signal.

8 Claims, 3 Drawing Sheets

SENSING ROTATION ANGLE

CROSS REFERENCE TO RELATED APPLICATIONS

Not applicable.

STATEMENT REGARDING FEDERALLY SPONSORED RESEARCH OR DEVELOPMENT

Not applicable.

MICROFICHE APPENDIX

Not applicable.

BACKGROUND OF THE INVENTION

The present invention concerns both an operation diagnostic system for an angle detector designed to measure the angle of a rotating part, and the process by which the diagnosis is made.

Angle detectors are known in which the angle traveled by the rotating part is measured via electrical pulses transmitted to a processor designed to make use of that information, sometimes after electronic pre-processing of the signal by a digital-analog converter. This type of detector is used, for instance, in automotive steering columns, where it transmits to an on-board processor the angular position of the steering wheel with respect to a fixed position.

With this type of detector, speed and direction of rotation are measured by two sensitive components, often consisting of optic forks, which work with a second element such as a notched disk. Each of said sensitive components features a light emitter and a light receptor, positioned on either side of the notched disk, in the same axis. The light beam is alternately continuous and cut off, depending on whether the emitter-receptor pair faces a notch or an uncut sector of the disk. Thus, as the shaft rotates, the emitter generates a digital signal in the form of a pulsed output.

Two sensitive components are positioned such that the electrical signals generated are 90° out of phase ($\pi/2$ radians), which allows the device to detect the direction of the shaft's rotation as well as its speed. This information is then transmitted to a processor, which uses it in whatever manner it has been designed for. In the case of a steering column, the main function of the processor is to calculate the rotation angle of the steering wheel.

To save costs, and for greater reliability, the output signal of the sensitive components is often carried to the processor by a single wire. Next, the two digital signals are encoded (e.g., a weighted encoding of their respective voltages) in order to produce an analog output signal which is easy to decode. The original signals are then simply reconstituted by comparing the single signal with predefined thresholds. This task is often carried out by the processor.

However, voltage levels fluctuate only if shaft rotation reaches a certain minimum angle, known as the blind angle. The blind angle is equal to one fourth of the period of the geometric configuration of the notched disk. This is not generally considered a problem, because the blind angle is small, and because applications take it into account.

However, when one of the elements of the device described above fails (emitter, receptor, coding or processing circuitry, electrical connection, etc.), the processor can be fooled by the lack of fluctuation in the detector's output signal into concluding that the shaft is no longer turning, or that its rotation is smaller than the blind angle.

Therefore, it has been desired to test the detector system and diagnose its real condition, so that an appropriate response can be made in case of need.

Detectors with diagnostic systems capable of running tests whenever the central processor issues the appropriate command are already available. However, existing assemblies are often costly, as they involve multiple electrical connections: one or two wires to carry the angle information, one to transmit the diagnostics command and one to send the test results to the central processor.

Other existing solutions use a single wire for transmitting all information, but they call for the multiplexing of signals, which means increased complexity and, again, higher costs. The cost of such solutions makes them unsuited to mass production applications such as in automobiles, where prices must be kept as competitive as possible. In particular, for automobile steering wheel applications the aforesaid type of solution is not useful.

BRIEF SUMMARY OF THE INVENTION

The present invention solves the above-described problems.

The main aim of the invention is to permit adding a diagnostic system to an angle of rotation detector without significant additional costs.

The system according to the invention is easy to install, and uses only a small number of standard components.

Furthermore, it calls for only a slight change to known detectors.

And yet, the information is carried on a single connection or conductor, without making a complicated electronic solution necessary.

More specifically, the object of the invention is a diagnostic system for an angle detector which measures the angle of a rotating part by sending at least two logic signals, in two states, said signals being processed by an electronic component which encodes them by adding their weighted voltages and outputs an analog signal with a voltage that is always above a predefined threshold when the detector functions normally. Thus, the value of the measured angle can be sent over a single electrical wire connecting the detector to a processor type device. Said connection is also used by the processor to transmit the diagnostic command signal, as well as to convey the result signal from the detector to the processor. The inventional system is characterized mainly in that it features:

an electronic device which lowers the voltage of the detector's output signal below said predefined threshold in response to a diagnostic command from the processing device, and an electronic device which detects the lowering of said output signal, connected to an electronic device which forces each of the dual-state logic signals to reach a value such that the processing device can predetermine and control the resulting output signal.

In a preferred embodiment of the invention, the voltage of the detector's output signal is lowered below a predefined threshold by a transistor. The transistor's has its base connected to the processor which sends the diagnostic command pulse, its receptor to the detector's output, and its emitter to ground.

Similarly, the lowering of the detector's output voltage is detected by an operational amplifier acting as a voltage comparator, with its negative input connected to said detector's output and its positive input connected to a Wheatstone bridge which calibrates the change-of-state threshold of its output, said output being sent to an electronic device which forces the dual-state logic signals to reach predefined values.

The invention can for instance be applied to a system in which the aforesaid dual-state logic signals are obtained from pairs of optical emitter-receptors, the emitters of which generate light when they are activated. This light may then be picked up by the receptors, depending on the position of the rotating part.

In a preferred embodiment of the invention, the pairs of emitter-receptors feature light-emitting diodes and phototransistors which produce dual-state digital logic signals.

In the aforesaid preferred embodiment, the dual-state logic signals are forced to reach predefined values by a comparator with a state-changing open collector output that changes to the high state whenever the detecting device senses a diagnostic command. Said output is connected to one pole of the emitters, whose opposite pole is at the power supply voltage, while the positive input of the comparator is connected to a Wheatstone bridge which calibrates its change-of-state threshold.

In a variant embodiment of the invention, the change of state of the positive input of the comparator is effected by charging a capacitor connected to the output of the detecting device via a diode in parallel with a resistor, and the discharge of the capacitor determines how long the comparator's output remains in the high state.

Thus, the invention allows the use of a single line for transmitting the information relating to the sensitive components themselves, the diagnostic command from the central processor, as well as the test result returned by the detector.

The design used is simple yet effective and calls only for basic electronic circuits made up of no more than a few standard components.

Furthermore, the total cost of such a system is entirely compatible with the economic imperatives of the automobile industry, and of mass-marketed applications in general.

The present invention also concerns a diagnostic process which makes use of the system described above.

The process of the present invention tests the operational condition of an angle detector designed to measure the angle of a rotating part, on the basis of at least two dual-state, digital logic signals processed by an electronic device which encodes them by adding their weighted voltages and outputs to an analog signal at a voltage that is always above a predefined threshold when the detector functions normally. Thus, the value of the measured angle can be sent over a single electrical wire connecting the detector to a processor type device. The single wire connection is also used by said device to transmit the diagnostic command signal, as well as the test result signal returned by the detector to the processing device. The process is characterized by the following steps:

in response to a diagnostic command signal emitted by the processing device, the voltage of the detector's output signal is reduced below the normal minimum operational threshold;

the detector detects the lowering of said output voltage;

this information is transmitted and used to inhibit normal operation and to force the logic signals to reach values which result in a predetermined, expected and controllable output signal.

BRIEF DESCRIPTION OF THE DRAWINGS

A more detailed description of the invention follows with reference to the appended figures, showing in.

DETAILED DESCRIPTION OF THE INVENTION

Figures 1A, 1B:
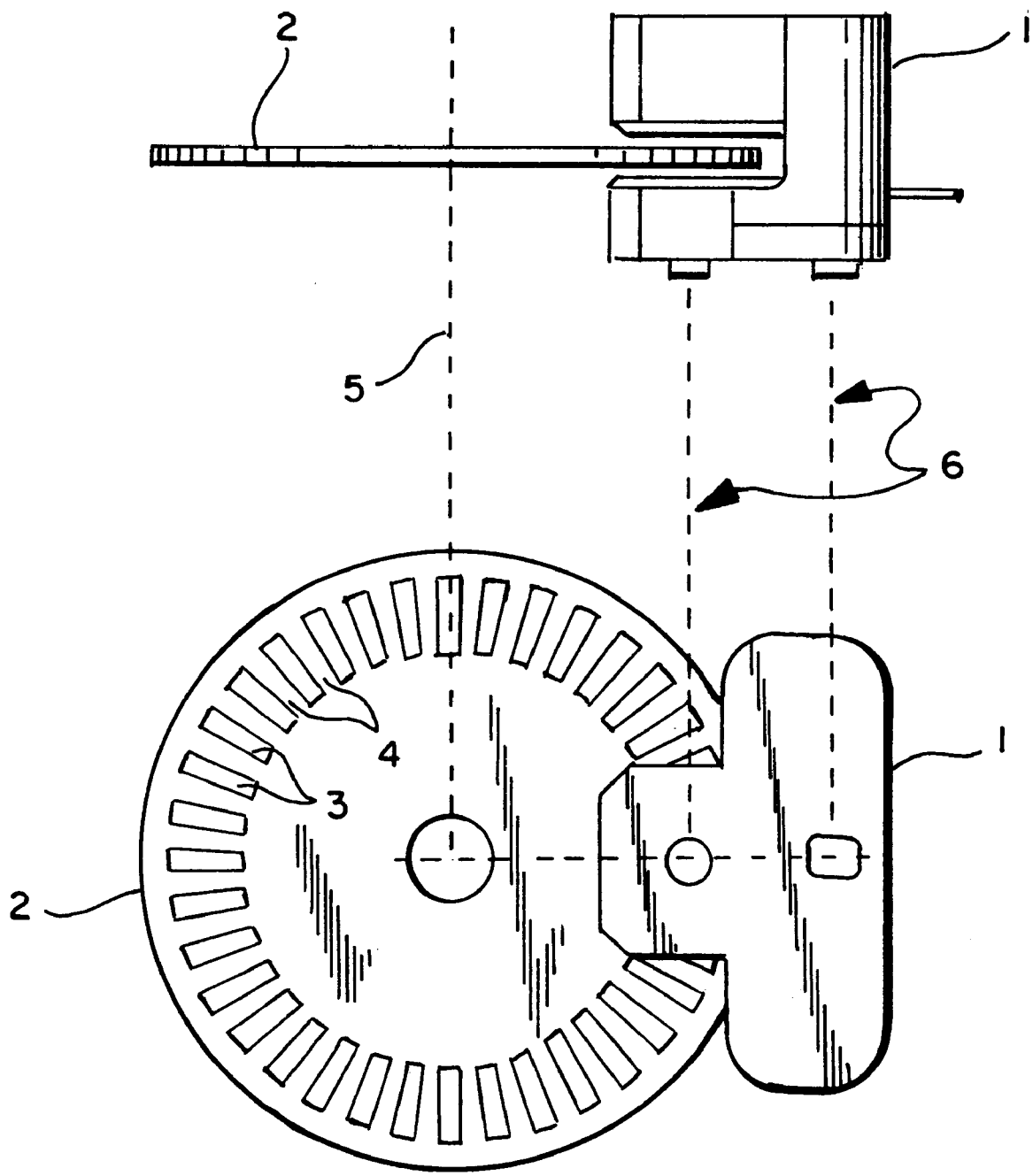
FIG. 1a, is a lateral view of an optical fork which cooperates with a notched disk.
FIG. 1b, is a top view of the same components.

The system shown in FIGS. 1a and 1b features an optical fork or bifurcated member 1 with one branch or leg thereof on either side of a disk 2, having on the edge thereof a plurality of cutouts 3 which alternate at regular intervals with uncut angular sections 4.

Disk 2 is attached to a shaft (not shown) which rotates around axis 5. The sensitive components are placed in the branches of optical fork 1, with two emitters on one branch facing two receptors on the other. In this example, the optical axes are referenced generally at 6 and staggered, so that the logic signals emitted by the receptors are offset by $\pi/2$ radians.

Figure 2:
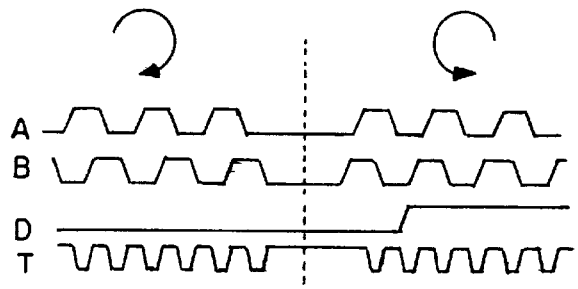
FIG. 2, is in the shape of the signals emitted by the sensitive components, as well as the shape of the processed signals.

Referring to FIG. 2, the aforesaid logic signals are shown and labeled A and B. The orientation of the one-fourth period offset depends on the direction of rotation, which is shown by the arrows above the diagram.

The next two signals, labeled D and T in FIG. 2, are the result of processing by the processor, or, more generally, by any appropriate electronic circuitry. Thus, signal T, which is useful for deriving the speed of rotation as well as for doing a count from which the angular travel value can be obtained, is the result of a logic exclusive OR operation on signals A and B.

Signal D gives the direction of rotation and can be obtained by comparing the incidence of the ascending or descending fronts of signals A and B.

Figure 3:
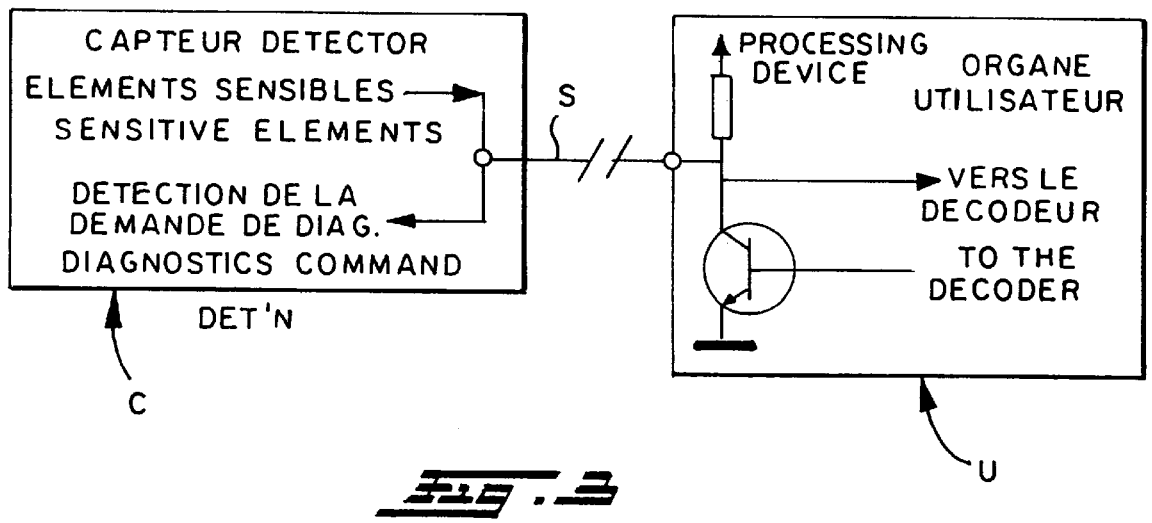
FIG. 3, is a simplified block diagram of the system.

The extremely simplified block diagram shown in FIG. 3 gives an idea of the components of the invention and of their positioning with respect to the single connecting wire S used for information transfer. Detector C, is comprised of the sensitive components, the encoding stage, and the diagnostic command detection- and implementation-circuitry.

The processing device U contains the circuitry which lowers the threshold voltage of signal S. It can also feature other circuits, such as those of the decoding stage. In an alternative embodiment of the invention, those circuits may be incorporated in the central processor, acting as peripherals to the latter.

Figure 4:
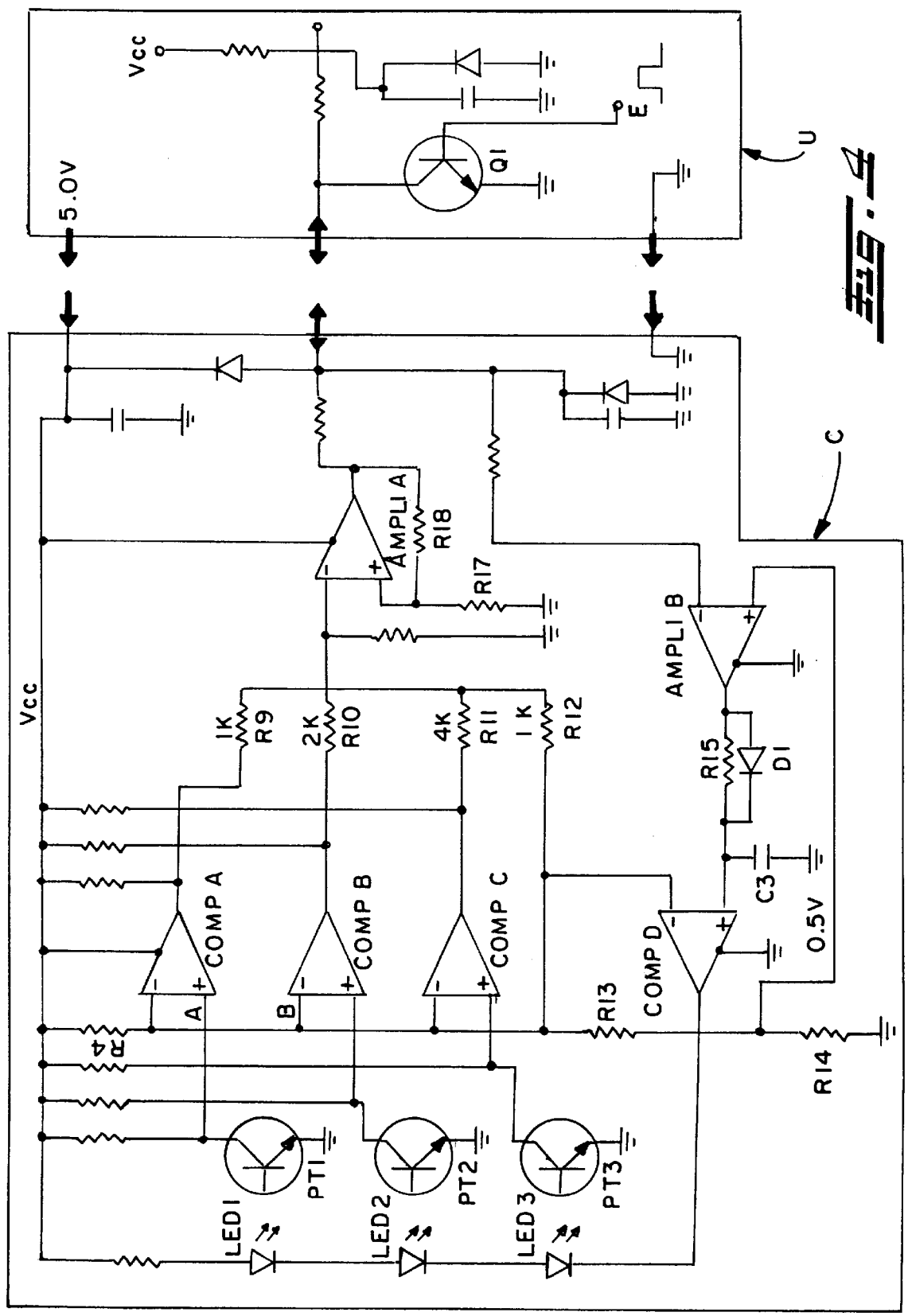
FIG. 4, is a complete electronic diagram of a possible embodiment of the invention.

FIG. 4 is a electrical schematic diagram of one embodiment of the invention.

In the illustrated embodiment, a third sensitive component is added, for related tasks which are not within the scope of the invention. Thus, three logic signals are to be encoded for transmission over a single wire S.

Referring to FIG. 4, the pairs of emitter-receptors are composed of three light-emitting diodes labeled LED1, LED2, LED3 coupled with three phototransistors labeled PT1, PT2, and PT3. The voltage coming from the phototransistors, producing signals A and B, is shaped by the three comparators labeled Comp A, Comp B, and Comp C which compare the voltages read respectively from the phototransistor collectors to a fixed voltage obtained from the Wheatstone bridge R4, R13, R14. Together with the operational amplifier Ampli A, the resistors R9, R10, R11 add the voltages from the open-collector outputs of comparators Comp A, Comp B, and Comp C.

Resistor R12 adds a voltage of 0.5 V, obtained from the same Wheatstone bridge R4, R13, R14, and contributes to the minimum voltage threshold at output S.

The resistors mentioned above R9, R10, R11 contribute to the weighting of the voltage values, and the gain of operational amplifier Ampli A is adjusted by resistors R17 and R18 so that output voltage S remains between 0.5 V and 5.0 V. Thus, detector C really transmits three different pieces of information over a single line S, with 0.5 V being always the minimum voltage at normal operation.

In addition to the above information, single line S must also transmit the diagnostic command from the processing device U and the return response to said command.

As previously discussed, the solution according to the invention is as follows: since the output signal cannot in principle fall below the 0.5 V threshold, the processing device has been designed so that it can itself force the line voltage below that value. Thus, it generates a controlled abnormal state on the line.

Detector C is configured so that it can then interpret this abnormal state as a diagnostic command, which it detects and processes by sending an answer the processor can easily understand. In FIG. 4, the processor is shown as part of the processing device U.

The circuit used to force the line below the normal minimum threshold voltage value of 0.5 V is a simple transistor Q1, with its collector connected to line S, its emitter connected to ground, and its base connected to the device which issues the diagnostic command, i.e., in this case a simple pulse E, a few milliseconds in duration.

When the voltage of line S becomes the ground voltage because the change of state of the transistor base makes the transistor conductive, the output of amplifier Ampli B, configured as a voltage comparator, instantly switches to the high state.

The capacitor C3 then charges via diode D1. It was previously discharged because it is connected via resistor R15 to the output of comparator Ampli B, which is normally in the low state.

The state of the output of open-collector comparator Comp D changes and the three light-emitting diodes LED1, LED2, LED3 immediately lose power. As they de-energize, the outputs of phototransistors PT1, PT2, and PT3 emit identical low signals.

Once transistor Q1 ends the grounding of line S, the three light-emitting diodes LED1, LED2, LED3 remain off for as long as the capacitor C3 discharges into the amplifier Ampli B via resistor R15. Said discharge lasts for a few milliseconds.

As soon as transistor Q1 is again blocked, line S returns to its normal condition; thus, it can transmit the state of the phototransistors PT1, PT2, and PT3, which is known because all the diodes are off while capacitor C3 is discharging.

Therefore, the processor knows the value of the signal it is supposed to receive, and can compare it to that of the actual signal. If it notes a difference, it concludes that a fault has occurred and responds with an appropriate strategy.

Therefore, the simple circuitry used by the invention allows diagnosis of most of the elements of the measuring sequence without the need to add intelligence to the system, e.g., in the form of a microprocessor. Furthermore, no wires have to be added to the single connection S originally used to transfer encoded logic signals.

The circuitry described above constitutes only a non-limiting example of the invention which is capable of modification and variation and which is defined by the following claims.

I claim:

1. An operational diagnostic system for an angle detector which measures the angle of a rotating part via at least two dual-state logic signals processed by an electronic device which encodes them as the weighted sum of their voltages in order to produce an analog signal at a voltage which is always greater than a predefined threshold when angle detector functions normally, in such a way that the value of the measured angle is transmitted over a single electrical connection connecting the output of angle detector to a processing device of the processor type, said connection being also used by processing device to transmit the command signal to start testing of the operation of detector, and to transmit the result information from detector to processing device, characterized in that it features the following:

an electronic device which lowers the output signal voltage of detector below said predefined threshold in response to a diagnostic command signal from the processing device, and an electronic device which detects the lowering of said detector output signal, connected to electronic device which forces each of the dual-state logic signals to reach a value enabling the processing device to determine and control the resulting output signal.

2. Diagnostic system according to claim 1, characterized in that the electronic device which lowers the voltage of detector output signal below said predefined threshold consist of a transistor with its base connected to processing device from which it receives the diagnostic command pulse, its collector connected to output of detector, and its emitter connected to ground.

3. Diagnostic system according to claim 1, characterized in that the electronic device which detects the lowering of the output voltage of detector consist of an operational amplifier functioning as a voltage comparator, with its negative input connected to said detector output and its positive input connected to a Wheatstone bridge which calibrates the change-of-state threshold of its output, said output being connected to an electronic device that forces the dual-state logic signals to reach predefined values.

4. Diagnostic system according to claim 1, characterized in that said dual-state logic signals are obtained from pairs of optical emitter-receptors in which the emitters generate light when they are activated, said light being picked up by the receptors or not, depending on the position of the rotating part.

5. Diagnostic system according to claim 4, characterized in that the pairs of emitter-receptors consist of light-emitting diodes and phototransistors.

6. Diagnostic system according to claim 4, characterized in that the electronic device which forces the dual-state logic signals to reach predefined values consists of a comparator, the open-collector output of which changes states and switches to the high state when said detecting device signals a diagnostic command, said output being connected to one pole of said emitters, while their other pole is at the power supply voltage; the positive input of said comparator being connected to the output of the detecting device and its negative input to a Wheatstone bridge.

7. Diagnostic system according to claim 6, characterized in that the state of the positive input of the comparator is changed by charging a capacitor connected to the output of the detecting device via a diode in parallel with a resistor, the discharging of said capacitor defining the length of time for which the output of said comparator is kept at the high state.

8. A process for testing the operation of an angle detector which measures the angle of a rotating part via at least two dual-state logic signals processed by an electronic device which encodes them as the weighted sum of their voltages in order to produce an analog signal at a voltage that is always greater than a predefined threshold when angle detector functions normally, in such a way that the value of the measured angle is transmitted over a single electrical connection connecting the output of angle detector to a processing device of processor type, said connection being also used by processing device to transmit the command signal which starts testing of the operation of detector, and to transmit the return information from detector to processing device, characterized by the following steps:

in response to a diagnostic command signal from the processing device, the output signal voltage of detector is reduced below the normal minimum operational threshold;

the detector detects the lowering of said output voltage;

this information is transmitted and used to inhibit normal operation and forces the logic signals to reach values which result in a predetermined, expected and controllable output signal.

* * * * *